(12) United States Patent
Boisvert

(10) Patent No.: US 7,667,204 B2
(45) Date of Patent: Feb. 23, 2010

(54) LOW-POWER POSITRON EMISSION TOMOGRAPHY (PET) IMAGING SYSTEM

(75) Inventor: David Michael Boisvert, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 102 days.

(21) Appl. No.: 12/069,663

(22) Filed: Feb. 12, 2008

(65) Prior Publication Data

US 2009/0200474 A1    Aug. 13, 2009

(51) Int. Cl.
*G01T 1/20* (2006.01)
(52) U.S. Cl. ................................ 250/369
(58) Field of Classification Search ................. 250/369, 250/370.01–370.15; 378/98.8
See application file for complete search history.

(56) References Cited

U.S. PATENT DOCUMENTS 4,864,140 A * 9/1989 Rogers et al. ............... 250/369

5,671,172 A    9/1997  Britton ........................ 365/45
2008/0103391 A1* 5/2008 Dos Santos Varela ....... 600/436

OTHER PUBLICATIONS

Lenox et al, "Coincidence Time Alignment for Planar Pixellated Emission Tomography Detector Arrays," Nuclear Science Symposium Conference Record, 2001 IEEE, vol. 4, pp. 1952-1954, (Nov. 4-10, 2001) San Diego, California. DOI: 10.1109/NSSMIC.2001.1009206.*

* cited by examiner

*Primary Examiner*—David P Porta
*Assistant Examiner*—Kiho Kim
(74) *Attorney, Agent, or Firm*—Mark C. Pickering

(57) ABSTRACT

The power consumed by a positron emission tomography (PET) imaging system is substantially reduced by utilizing an analog memory, such as a switch-capacitor analog memory, to sample and store analog values for a number of gamma ray signals so that only the stored analog values that represent pairs of gamma rays with coincident emission and vectors that are opposite to each other are digitized. In addition, the digitization is performed at a much slower clock frequency.

22 Claims, 3 Drawing Sheets

LOW-POWER POSITRON EMISSION TOMOGRAPHY (PET) IMAGING SYSTEM

BACKGROUND OF THE INVENTION

1. Field of the Invention

The present invention relates to a positron emission tomography (PET) imaging system, and more particularly, to a low-power positron emission tomography (PET) imaging system.

2. Description of the Related Art

A positron emission tomography (PET) imaging system is an imaging system that generates an image of a structure based on the gamma rays that are emitted by the structure. PET imaging systems receive large numbers of gamma rays, detect pairs of common gamma rays from the large numbers of gamma rays, and analyze the pairs of common gamma rays to generate an image.

The pairs of common gamma rays differ from other gamma rays in that the gamma rays in each pair of common gamma rays are coincidentally-emitted from a common point of origin with directional vectors that are 180° apart from each other. Thus, by detecting the pairs of common gamma rays, the point of origin of each pair can be determined, and an image can be generated based on the point of origins of the pairs of common gamma rays.

The pairs of common gamma rays are emitted in response to positron decay. A positron is a particle with the same mass as an electron, but with a positive electric charge. Positron decay occurs when there are too many protons in a nucleus, but not enough energy to emit an alpha particle. When this occurs, a positron and an electron combine, and the two particles annihilate each other. The annihilation, in turn, creates a pair of common gamma rays that are emitted from a common point of origin with directional vectors that are 180° apart (in opposite directions) from each other.

PET imaging systems are often used in medical applications to image cellular structures within a human body. The image of a cellular structure can be enhanced by introducing glucose-like molecules, which contain atoms that exhibit positron decay, into the body. In these applications, the cellular structures of interest have high cellular activity and, therefore, use a large amount of glucose.

Since the cellular structures of interest use a large amount of glucose, the cellular structures of interest also use a large amount of the glucose-like molecules. This large use, in turn, substantially increases the number of pairs of common gamma rays that are emitted by the cellular structures of interest, thereby enhancing the image of the cellular structures of interest.

FIG. 1 shows a view that illustrates an example of a prior-art PET imaging system 100. As shown in FIG. 1, PET imaging system 100 includes a circular support structure 110, and a number of gamma ray detectors GD1-GDn that are attached to the inner surface of circular support structure 110. (Only eight gamma ray detectors GD1-GD8 are shown for purposes of clarity.) The gamma ray detectors GD1-GDn, in turn, output a corresponding number of gamma ray signals GS1-GSn, where a change in the magnitude of a gamma ray signal GS indicates the reception of a gamma ray particle. For example, a gamma ray particle can be received from a human body 112.

Conventionally, a gamma ray detector includes scintillation crystals that receive a gamma ray particle, such as from a human body, and convert the gamma ray particle into a light ray. For example, bismuth germinate (BGO), which has a high efficiency (large stopping power), and barium fluoride (BaF2), which has a faster response than BGO (although less efficient than BGO), are commonly used scintillation crystals.

In addition, a conventional gamma ray detector also includes a photo multiplier tube (PMT) that converts the light ray output by the scintillation crystals into an electric signal, and a variable gain amplifier (VGA) that amplifies the electric signal and outputs the amplified electric signal as a gamma ray signal GS.

As further shown in FIG. 1, PET imaging system 100 includes a number of analog-to-digital (A/D) converters AD1-ADn that are connected to the gamma ray detectors GD1-GDn so that each A/D converter AD1-ADn is connected to a different gamma ray detector GD to receive a different gamma ray signal GS. (Only eight A/D converters AD1-AD8 are shown for purposes of clarity. In addition, the A/D converters AD1-ADn can include input buffer amplifiers.)

In operation, the A/D converters AD1-ADn digitize the gamma ray signals GS1-GSn in response to each rising edge of a sample clock signal CLK during an image collection period of time, and output a corresponding number of digitized gamma ray signals DG1-DGn in response to the digitization. The sample clock signal CLK can have a frequency of, for example, 200 MHz.

PET imaging system 100 additionally includes a coincidence detector 114 and a gamma ray analyzer 116. Coincidence detector 114 has a number of inputs DD1-DDn that are also connected to the gamma ray detectors GD1-GDn to receive the gamma ray signals GS1-GSn so that each input DD is connected to a different gamma ray detector GD to receive a different gamma ray signal GS. In addition, gamma ray analyzer 116 has a number of analyzer inputs AA1-AAn that are connected to the A/D converters A/D1-A/Dn such that each analyzer input AA is connected to the output of a different A/D converter A/D.

In operation, coincidence detector 114 samples each of the gamma ray signals GS1-GSn in response to each rising edge of the sample clock signal CLK during the image collection period of time to identify each pair of gamma ray signals GS that represent a pair of common gamma rays. As noted above, a pair of common gamma rays has coincident emission and rays with directional vectors that are 180° apart from each other.

When coincidence detector 114 identifies a pair of gamma ray signals that represent a pair of common gamma rays, coincidence detector 114 outputs coincidence data CD to gamma ray analyzer 116. The coincidence data CD, in turn, identifies the digitized gamma ray signals DG1-DGn that correspond with the pair of gamma ray signals that represent the pair of common gamma rays.

Gamma ray analyzer 116, which is typically implemented as a digital signal processor (DSP), responds to the coincidence data CD by utilizing the digitized gamma ray signals DG1-DGn, which correspond with the pair of gamma ray signals that represent a pair of common gamma rays, to determine the origin of the pair of common gamma rays. This and other information is then used to generate an image of a cellular structure within human body 112. Gamma ray analyzer 116 also controls the gain of the VGAs in the gamma ray detectors GD1-GDn by way of feedback signal FS.

One of the drawbacks of PET imaging system 100 is that system 100 consumes a lot of power. Thus, there is a need for a PET imaging system that utilizes less energy.

DETAILED DESCRIPTION OF THE INVENTION

Figure 1:
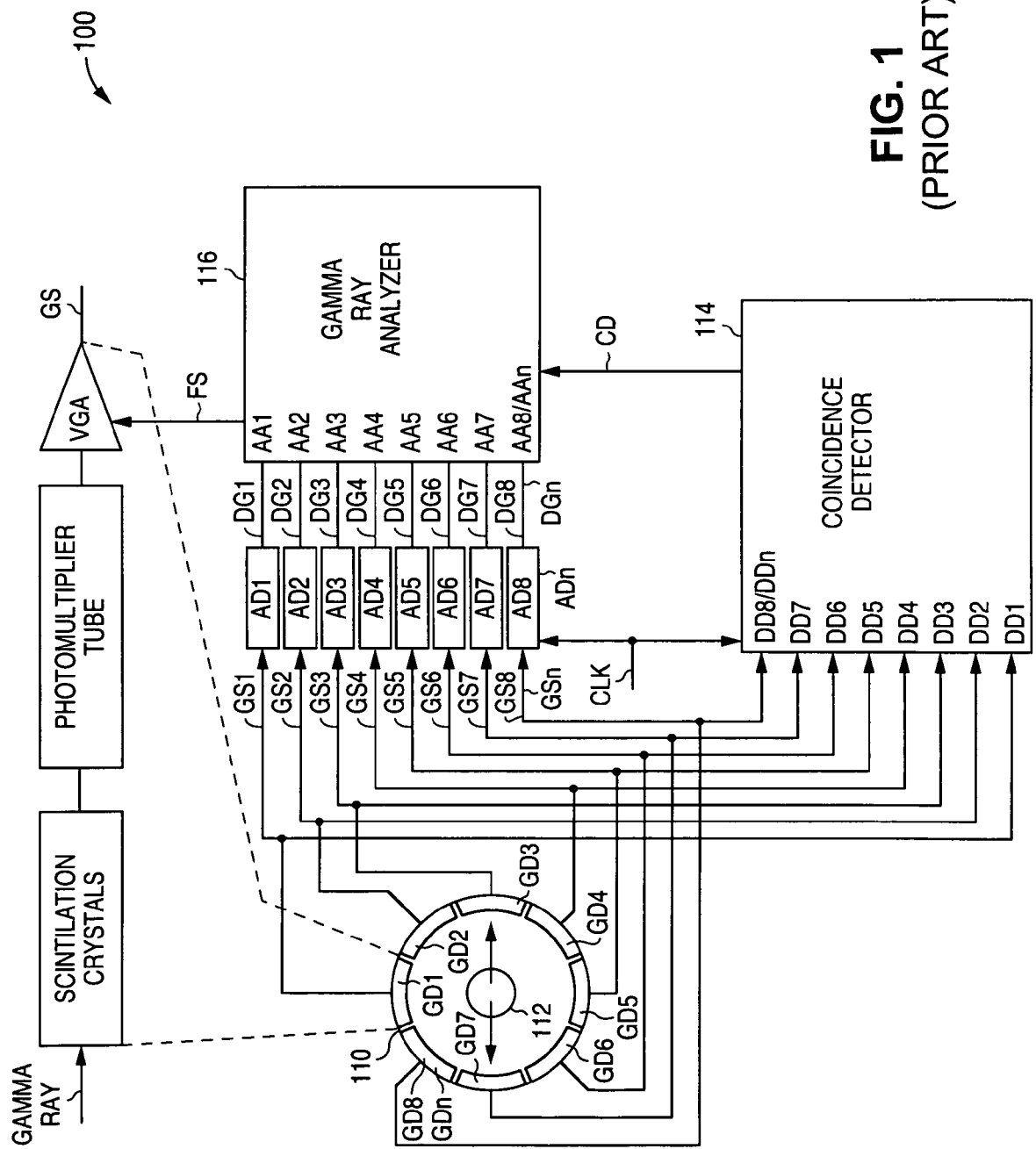
FIG. 1 is a view illustrating an example of a prior-art PET imaging system 100.
Figure 2:
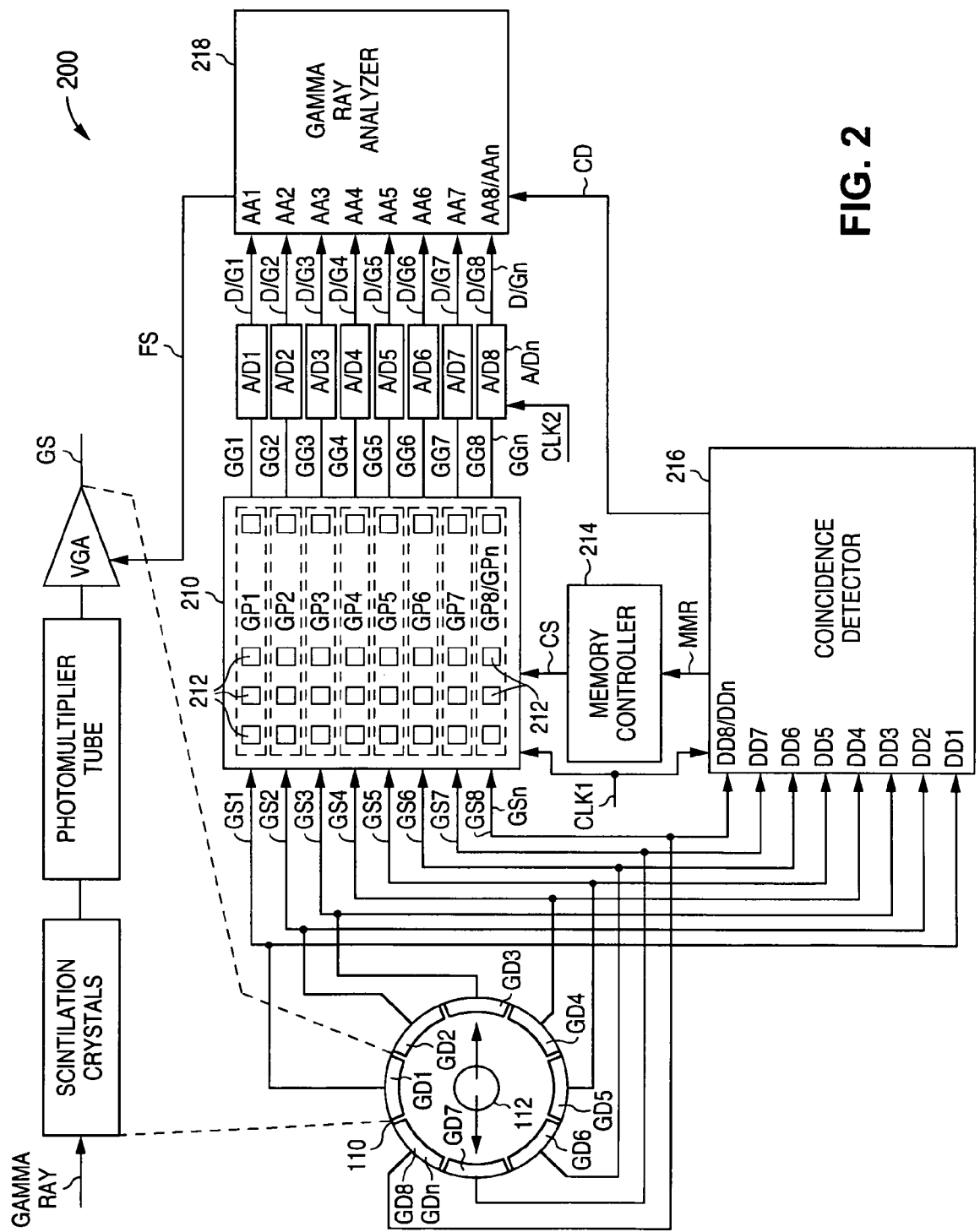
FIG. 2 is a view illustrating an example of a PET imaging system 200 in accordance with the present invention.

FIG. 2 shows a view that illustrates an example of a PET imaging system 200 in accordance with the present invention. As described in greater detail below, the PET imaging system of the present invention consumes substantially less power than prior-art PET imaging systems by reducing the rate of digitization.

PET imaging system 200 is similar to PET imaging system 100 and, as a result, utilizes the same reference numerals to designate the structures that are common to both imaging systems. As shown in FIG. 2, PET imaging system 200 differs from PET imaging system 100 in that imaging system 200 includes an analog memory 210 that is connected to the gamma ray detectors GD1-GDn.

Analog memory 210, which can be implemented as, for example, a switched-capacitor analog memory, includes an array of memory cells 212 that are organized into a number of groups of memory cells GP1-GPn. The groups of memory cells GP1-GPn are connected to the gamma ray detectors GD1-GDn to receive the gamma ray signals GS1-GSn so that each group of memory cells GP is connected to a different gamma ray detector GD to receive a different gamma ray signal GS.

For example, the first group of memory cells GP1 is connected to gamma ray detector GD1 to receive gamma ray signal GS1, while the second group of memory cells GP2 is connected to gamma ray detector GD2 to receive gamma ray signal GS2 and the third group of memory cells GP3 is connected to gamma ray detector GD3 to receive gamma ray signal GS3.

Further, the number of groups of memory cells GP1-GPn in analog memory 210 have a corresponding number of group outputs GG1-GGn so that each group of memory cells GP in analog memory 210 has a different group output GG. For example, the first group of memory cells GP1 has a first output GG1, while the second group of memory cells GP2 has a second output GG2 and the third group of memory cells GP3 has a third output GG3.

In addition, as further shown in FIG. 2, PET imaging system 200 also differs from PET imaging system 100 in that imaging system 200 includes a memory controller 214 that is connected to analog memory 210. In operation, memory controller 214 outputs a set of control signals CS (carrying serial or parallel data) to analog memory 210. The control signals CS command analog memory 210 to sample each gamma ray signal GS1-GSn with the rising edge of a first sample clock signal CLK1 during a coincidence detection and process period of time to generate a sequence of analog values for each gamma ray signal GS1-GSn. The first sample clock signal CLK1 can have a frequency of, for example, 200 MHz.

Further, each analog value in the sequence of analog values for each gamma ray signal GS1-GSn is written into the number of groups of memory cells GP1-GPn when the analog value is sampled. As a result, each analog value in the sequence of analog values for a gamma ray signal GS is written into the group of memory cells GP that is connected to receive the gamma ray signal GS when sampled.

For example, the first analog value in the sequence of analog values for each gamma ray signal GS1-GSn can be written into the first memory cells in the number of groups of memory cells GP1-GPn on the first rising edge of the first sample clock signal CLK1, and the second analog value in the sequence of analog values for each gamma ray signal GS1-GSn can be written into the second memory cells in the number of groups of memory cells GP1-GPn on the second rising edge of the first sample clock signal CLK1.

In other words, the first analog value in the sequence of analog values for gamma ray signal GS1 can be written into the first memory cell 212 in memory cell group GP1, and the first analog value in the sequence of analog values for gamma ray signal GS2 can be written into the first memory cell 212 in memory cell group GP2 on the first rising edge of the first sample clock signal CLK1.

In addition, the second analog value in the sequence of analog values for gamma ray signal GS1 can be written into the second memory cell 212 in memory cell group GP1, and the second analog value in the sequence of analog values for gamma ray signal GS2 can be written into the second memory cell 212 in memory cell group GP2 on the second rising edge of the first sample clock signal CLK1.

Further, the number of samples that occur during the coincidence detection and process period of time determines the number of memory cells 212 that must be included within each group of memory cells GP1-GPn. In other words, the number of memory cells 212 in a group of memory cells GP must be sufficient to store the analog value associated with each sample (taken on each rising clock edge) for the duration of the coincidence detection and process period of time before any of the memory cells 212 in the group of memory cells GP can be overwritten.

For example, if the coincidence detection and process period of time is equal to 32 clock periods which, in turn, is equal to 32 samples (one edge per clock period), then each group of memory cells GP1-GPn must include 32 memory cells 212. In this example, the first memory cell 212 is rewritten to store the analog value of the $33^{rd}$ sample.

In addition to the above, the control signals CS generated by memory controller 214 also command analog memory 210 to place a number of pairs of analog values from analog memory 210 on the corresponding group outputs GG1-GGn as identified in a memory read request MMR. Pairs of analog values are read from analog memory 210 because every coincident event generates a pair of gamma rays. In other words, in response to a memory read request MMR, memory controller 214 generates the control signals CS to command analog memory 210 to place a number of pairs of stored analog values on the corresponding group outputs GG1-GGn.

In addition, as further shown in FIG. 2, PET imaging system 200 also differs from PET imaging system 100 in that imaging system 200 utilizes a coincidence detector 216 in lieu of coincidence detector 114. Coincidence detector 216 is identical to coincidence detector 114, except that coincidence detector 216 samples on the rising edge of the first sample clock signal CLK1 and generates a memory read request MMR following a sample when one or more pairs of gamma ray signals satisfy a predetermined condition. In the present example, the predetermined condition is coincident emission and rays with directional vectors that are 180° apart from each other.

PET imaging system 200 further differs from PET imaging system 100 in that PET imaging system 200 utilizes a number of A/D converters A/D1-A/Dn in lieu of the A/D converters AD1-ADn. A/D converters A/D1-A/Dn are the same as A/D converters AD1-ADn, except that the inputs of the A/D converters A/D1-A/Dn are not connected to the gamma ray detectors GD1-GDn, but instead are connected to the group outputs GG1-GGn of the groups of memory cells GP1-GPn in analog memory 210 so that each A/D converter A/D1-A/Dn is connected to a group output GG from a different group of memory cells GP.

In operation, the A/D converters A/D1-A/Dn digitize the analog values placed on the group outputs GG by analog memory 210 in response to each rising edge of a second sample clock signal CLK2 during an image collection period of time, and output a corresponding number of digitized gamma ray signals D/G1-D/Gn in response to the digitization. The second sample clock signal CLK2 (which is shown input to only A/D converter A/D8/A/Dn for purposes of clarity) can have a frequency of, for example, 2 MHz.

PET imaging system 200 additionally differs from PET imaging system 100 in that PET imaging system 200 utilizes a gamma ray analyzer 218 in lieu of gamma ray analyzer 116. Gamma ray analyzer 218 responds to the coincidence data CD by utilizing the digitized gamma ray signals D/G1-D/Gn, which correspond with pairs of gamma ray signals that represent pairs of common gamma rays, to determine the origin of the pairs of common gamma rays. Gamma ray analyzer 218 also controls the gain of the VGAs in the gamma ray detectors GD1-GDn by way of feedback signal FS.

As an example of the operation of PET imaging system 200, on the first rising edge of the first sample clock signal CLK1, the current analog value of each gamma ray signal GS1-GSn input to each group of memory cells GP1-GPn is stored in the first memory cell of each group. In other words, on the first rising edge of the first sample clock signal CLK1, the current analog value of the first gamma ray signal GS1 input to a first group of memory cells GP1 is stored in the first memory cell of the first group GP1, while the current analog value of the second gamma ray signal GS2 input to a second group of memory cells GP2 is stored in the first memory cell of the second group GP2.

At the same time, on the first rising edge of the first sample clock signal CLK1, coincidence detector 216 samples each gamma ray signal GS1-GSn input to coincidence detector 216 to identify each pair of gamma ray signals GS in the first sample that satisfy a predetermined condition. In the present example, the predetermined condition is that each pair of gamma rays signals GS must represent a pair of common gamma rays with coincident emission and rays that are 180° apart from each other.

On the second rising edge of the first sample clock signal CLK1, the current analog value of each gamma ray signal GS1-GSn input to each group of memory cells GP1-GPn is stored in the second memory cell of each group. In other words, on the second rising edge of the first sample clock signal CLK1, the current analog value of the first gamma ray signal GS1 input to the first group of memory cells GP1 is stored in the second memory cell of the first group GP1, while the current analog value of the second gamma ray signal GS2 input to the second group of memory cells GP2 is stored in the second memory cell of the second group GP2.

At the same time, on the second rising edge of the first sample clock signal CLK1, coincidence detector 216 samples each gamma ray signal GS1-GSn input to coincidence detector 216 to identify each pair of gamma ray signals GS in the second sample that satisfy the predetermined condition. At this time, coincidence detector 216 is still processing the analog values that were stored on the first rising edge of the first sample clock signal CLK1.

On the $m^{th}$ rising edge of the first sample clock signal CLK1, the current analog value of each gamma ray signal GS1-GSn input to each group of memory cells GP1-GPn is stored in the $m^{th}$ memory cell of each group. In other words, on the $m^{th}$ rising edge of the first sample clock signal CLK1, the current analog value of the first gamma ray signal GS1 input to the first group of memory cells GP1 is stored in the $m^{th}$ memory cell of the first group GP1, while the current analog value of the second gamma ray signal GS2 input to the second group of memory cells GP2 is stored in the $m^{th}$ memory cell of the second group GP2.

At the same time, on the $m^{th}$ rising edge of the first sample clock signal CLK1, coincidence detector 216 samples each gamma ray signal GS1-GSn input to coincidence detector 116 to identify each pair of gamma ray signals GS in the $m^{th}$ sample that satisfy the predetermined condition. In addition, in the present example, the end of the $m^{th}$ clock period represents the end of a first coincidence detection and process period of time.

The coincidence detection and process period of time is the time required for coincidence detector 216 to determine which pairs of gamma ray signals GS1-GSn sampled on a rising edge of the first sample clock signal CLK1 satisfy the predetermined condition, and output a memory read request, and then the time required for memory controller 214 and analog memory 210 to process the memory read request and output the identified analog values.

As a result, the first coincidence detection and process period of time includes the time required for coincidence detector 216 to determine which pairs of gamma ray signals GS1-GSn sampled on the first rising edge of the first sample clock signal CLK1 satisfy the predetermined condition, and output a memory read request to memory controller 214 and the coincidence data CD for the first sample to gamma ray analyzer 122. The first coincidence detection and process period of time also includes the time required for memory controller 214 and analog memory 210 to process the memory read request and output the identified analog values.

Thus, on the $m+1^{th}$ rising edge of the first sample clock signal CLK1, the current analog value of each gamma ray signal GS1-GSn input to each group of memory cells GP1-GPn is again stored in the first memory cell of each group. In other words, on the $m+1^{th}$ rising edge of the first sample clock signal CLK1, the current analog value of the first gamma ray signal GS1 input to the first group of memory cells GP1 is stored in the first memory cell of the first group GP1, while the current analog value of the second gamma ray signal GS2 input to the second group of memory cells GP2 is stored in the first memory cell of the second group GP2.

In addition, in the present example, the end of the $m+1^{th}$ clock period represents the end of a second coincidence detection and process period of time. The second coincidence detection and process period of time includes the time required for coincidence detector 216 to determine which pairs of gamma ray signals GS1-GSn sampled on the second rising edge of the first sample clock signal CLK1 satisfy the predetermined condition, and output a memory read request to memory controller 214 and the coincidence data CD for the second sample to gamma ray analyzer 122. The second coincidence detection and process period of time also includes the time required for memory controller 214 and analog memory 210 to process the memory read request and output the identified analog values.

Gamma ray analyzer 218 responds to the coincidence data CD by utilizing the digitized gamma ray signals D/G1-D/Gn, which correspond with the pairs of gamma ray signals that represent pairs of common gamma rays, to determine the origin of the pairs of common gamma rays. This and other information is then used to generate an image of a cellular structure within human body 112.

One of the advantages of PET imaging system 200 over PET imaging system 100 is that PET imaging system 200 consumes substantially less power. In prior-art PET imaging system 100, each A/D converter AD1-ADn samples the gamma ray signals GS1-GSn in response to the first sample clock signal CLK1, which has a frequency of 200 MHz, and digitizes the gamma ray signals GS1-GSn at a very high resolution, such as 12 bits. As a result, a very high volume of digital data is created and processed at high speed. This consumes a lot of power which, for the most part, is wasted because at any time most of the gamma ray detectors GD1-GDn are not detecting a gamma ray of interest.

On the other hand, in the present invention, the power consumed is substantially reduced by utilizing analog memory 210 to sample and store the analog values of the gamma ray signals GS1-GSn in response to the first sample clock signal CLK1, which has a frequency of 200 MHz. Relatively little system power is required to sample and store the analog values in analog memory 210.

In addition, only select A/D converters in imaging system 200 need to digitize an analog value, and these A/D converters A/D1-A/Dn no longer need to operate at the first sample clock signal CLK1 (200 MHz), but instead can operate at the much slower speed of the second sample clock signal (2 MHz), thereby substantially saving on system power. In other words, coincidence detector 216 only outputs a memory read request to memory controller 214 for specific analog values that satisfy the predetermined condition. As a result, only the A/D converters A/D1-A/Dn in system 200 that correspond with a specific analog value even digitize a stored analog value, and this digitization can be done at a much slower speed. Thus, by reducing the rate of digitization from, for example, 200 MHz to 2 MHz, PET imaging system 200 consumes substantially less power than prior-art imaging systems.

Figure 3:
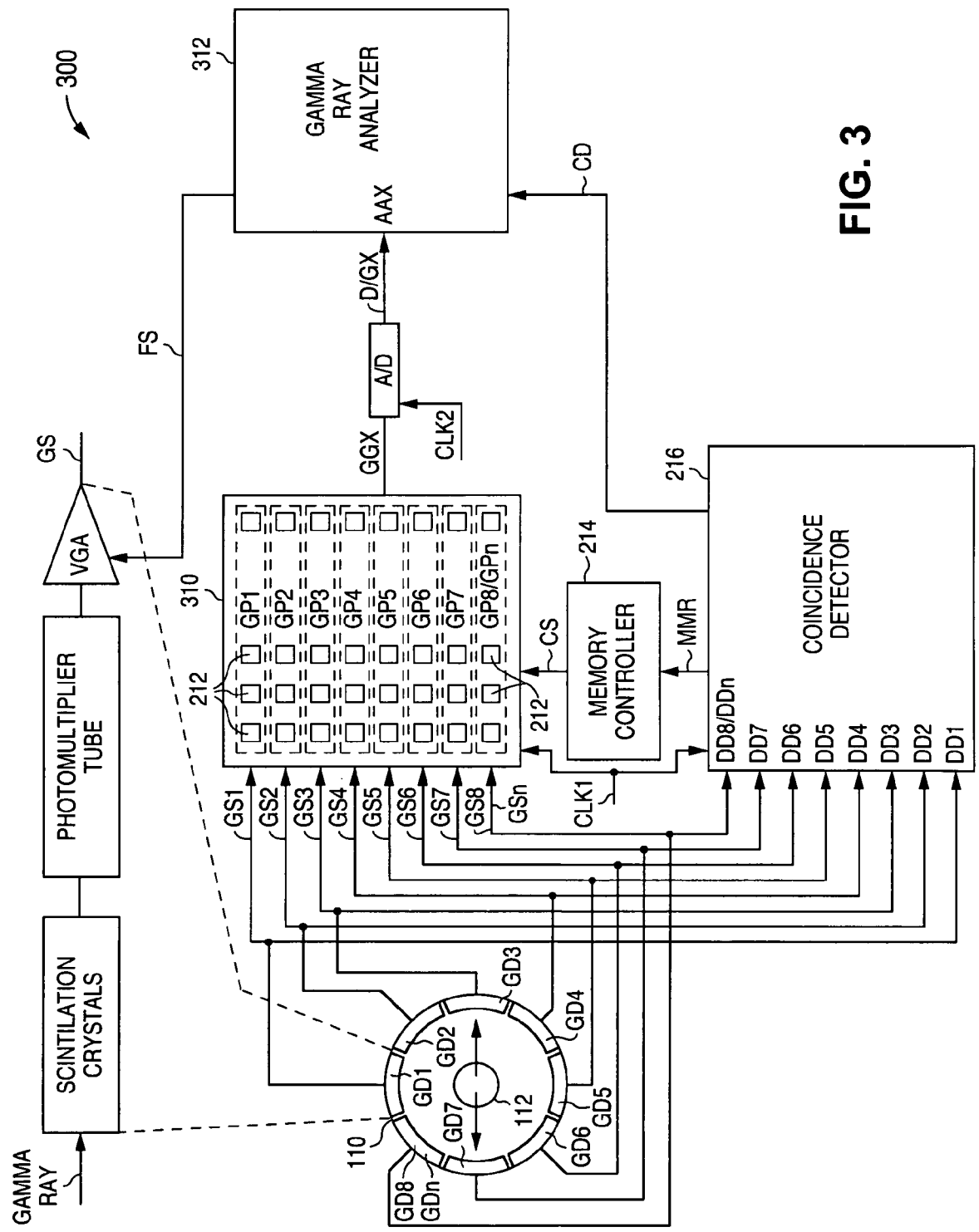
FIG. 3 is a view illustrating an example of a PET imaging system 300 in accordance with the an alternate embodiment of present invention.

FIG. 3 shows a view that illustrates an example of a PET imaging system 300 in accordance with an alternate embodiment of the present invention. PET imaging system 300 is similar to PET imaging system 200 and, as a result, utilizes the same reference numerals to designate the structures that are common to both imaging systems.

As shown in FIG. 3, PET imaging system 300 differs from PET imaging system 200 in that imaging system 300 utilizes an analog memory 310 in lieu of analog memory 210. Analog memory 310, in turn, differs from analog memory 210 in that the memory cells 212 in analog memory 310 can be randomly accessed, and sequentially read out to a single common memory array output GGX. Thus, analog memory 310 operates the same as analog memory 210, except that analog memory 310 sequentially places analog values on the common output in response to the number of control signals.

As further shown in FIG. 3, PET imaging system 300 also differs from PET imaging system 200 in that imaging system 300 utilizes a single A/D converter A/DX in lieu of the A/D converters A/D1-A/Dn. The single A/D converter A/DX has an input connected to the single output GGX of analog memory 310 to receive analog values from the number of groups of memory cells GP, and a single output that generates a digitized gamma ray signal D/GX in response to the digitization of an analog value.

In addition, PET imaging system 300 also utilizes a gamma ray analyzer 312 in lieu of gamma ray analyzer 218. Gamma ray analyzer 312 is the same as gamma ray analyzer 218, except that gamma ray analyzer 312 has a single input AAX that receives serial data rather than parallel data.

Thus, PET imaging system 300 operates the same as PET imaging system 200, except that analog memory 310 outputs analog values serially to a single A/D converter rather than in parallel to the A/D converters A/D1-A/Dn. By using a single A/D converter rather than a number of A/D converters, the power required by system 300 can be further reduced.

It should be understood that the above descriptions are examples of the present invention, and that various alternatives of the invention described herein may be employed in practicing the invention. For example, although the invention has been discussed in terms of the rising edge of a clock signal, the falling edge or both edges can alternately be used. Therefore, it is intended that the following claims define the scope of the invention and that structures and methods within the scope of these claims and their equivalents be covered thereby.

What is claimed is:

1. A positron emission tomography (PET) imaging system comprising:
   an analog memory having a number of groups of memory cells that are connected to receive a number of gamma ray signals so that each group of memory cells is connected to receive a different gamma ray signal; and
   a coincidence detector having a number of inputs that are connected to receive the number of gamma ray signals so that each input is connected to receive a different gamma ray signal, the coincidence detector to sample each gamma ray signal a number of times over a period of time to identify each pair of gamma ray signals in each sample that satisfy a predetermined condition, the coincidence detector to generate a memory read request for a sample when one or more pairs of gamma ray signals from the sample satisfy the predetermined condition.

2. The PET imaging system of claim 1 wherein the memory read request identifies locations in the analog memory that store analog values that correspond with said one or more pairs of gamma ray signals that satisfy the predetermined condition.

3. The PET imaging system of claim 2 wherein the number of groups of memory cells in the analog memory has a corresponding number of group outputs so that each group of memory cells in the analog memory has a different group output.

4. The PET imaging system of claim 3 wherein the number of groups of memory cells places pairs of analog values on the group outputs in response to a number of control signals.

5. The PET imaging system of claim 4 and further comprising a number of analog-to-digital (A/D) converters that are connected to the number of groups of memory cells in the analog memory so that each A/D converter is connected to receive a group output from a different group of memory cells.

6. The PET imaging system of claim 5 wherein the analog memory and the coincidence detector are connected to a first sample clock signal, the number of A/D converters is connected to a second sample clock signal, and the first sample clock signal has a frequency that is substantially higher than a frequency of the second clock signal.

7. The PET imaging system of claim 2 wherein the number of groups of memory cells in the analog memory has a common output.

8. The PET imaging system of claim 7 wherein the number of groups of memory cells sequentially places analog values on the common output in response to a number of control signals.

9. The PET imaging system of claim 8 and further comprising a single analog-to-digital (A/D) converter that is connected to the analog memory to receive analog values from the number of groups of memory cells in the analog memory.

10. The PET imaging system of claim 9 wherein the analog memory and the coincidence detector are connected to a first sample clock signal, the single A/D converter is connected to a second sample clock signal, and the first sample clock signal has a frequency that is substantially higher than a frequency of the second clock signal.

11. The PET imaging system of claim 1 and further comprising a memory controller connected to the analog memory, the memory controller outputting control signals to the analog memory to sample each gamma ray signal the number of times over the period of time to generate a sequence of analog values for each gamma ray signal, each analog value in the sequence of analog values for each gamma ray signal being written into the number of groups of memory cells when sampled.

12. The PET imaging system of claim 11 wherein the sequence of analog values associated with a gamma ray signal is written to the group of memory cells that is connected to receive the gamma ray signal.

13. The PET imaging system of claim 12 wherein the memory controller outputs control signals to the analog memory to place a number of pairs of analog values from the analog memory on a number of pairs of group outputs as identified in the memory read request.

14. The PET imaging system of claim 13 and further comprising a plurality of analog-to-digital (A/D) converters that are connected to the plurality of groups of memory cells in the analog memory so that each A/D converter is connected to receive a group output from a different group of memory cells.

15. The PET imaging system of claim 14 wherein the analog memory and the coincidence detector are connected to a first sample clock signal, the number of A/D converters is connected to a second sample clock signal, and the first sample clock signal has a frequency that is substantially higher than a frequency of the second clock signal.

16. The PET imaging system of claim 15 and further comprising a gamma ray analyzer having a number of analyzer inputs that are connected to the A/D converters such that each analyzer input is connected to the output of a different A/D converter.

17. The PET imaging system of claim 15 wherein the analog memory and the coincidence detector sample the number of gamma ray signals at a same time.

18. The PET imaging system of claim 17 wherein the analog memory and the coincidence detector sample the number of gamma ray signals on every other edge of a clock signal.

19. The PET imaging system of claim 17 wherein the analog memory and the coincidence detector sample the number of gamma ray signals on the rising edge of the clock signal.

20. An imaging system comprising:
a coincidence detector to sample a plurality of analog signals in response to a clock edge to form a plurality of first sampled analog values, identify a pair of first sampled analog values from the plurality of first sampled analog values that satisfy a predetermined condition, and output a memory read request that identifies the pair of first sampled analog values that satisfy the predetermined condition; and
an analog memory to sample the plurality of analog signals in response to the clock edge to form a plurality of second sampled analog values, store the plurality of second sampled analog values as a plurality of stored analog values, and output a pair of stored analog values from the plurality of stored analog values that correspond with the pair of first sampled analog values identified by the memory read request.

21. The imaging system of claim 20 and further comprising an analog-to-digital converter circuit connected to the analog memory to digitize the pair of stored analog values.

22. The imaging system of claim 21 wherein the plurality of analog signals represent a plurality of gamma rays.

* * * * *